United States Patent [19]

Hashimoto et al.

[11] 4,363,547

[45] Dec. 14, 1982

[54] APPARATUS FOR MOUNTING A FILM MAGAZINE INTO CAMERA

[75] Inventors: Akira Hashimoto, Hachioji; Hitoshi Shirai, Sagamihara, both of Japan

[73] Assignee: Olympus Optical Co., Ltd., Japan

[21] Appl. No.: 284,461

[22] Filed: Jul. 17, 1981

[30] Foreign Application Priority Data

Aug. 1, 1980 [JP] Japan .................. 55-106505

[51] Int. Cl.³ .................. G03B 1/04; G03B 1/12; G03B 19/04

[52] U.S. Cl. .................. 354/212; 242/71.1; 354/173; 354/275; 354/289

[58] Field of Search .............. 354/212, 213, 214, 173, 354/275, 202, 203, 204, 170, 171; 242/71, 71.1

[56] References Cited

U.S. PATENT DOCUMENTS

| | | | |
|---|---|---|---|
| 2,537,883 | 1/1951 | Ernisse | 354/212 |
| 3,364,832 | 1/1968 | Engelsmann et al. | 354/202 |
| 3,633,480 | 1/1972 | Kondo | 354/212 |
| 3,823,891 | 7/1974 | Schrader | 242/71.1 |
| 3,882,516 | 5/1975 | Ogiso et al. | 354/173 |

FOREIGN PATENT DOCUMENTS

| | | | |
|---|---|---|---|
| 1448045 | 6/1966 | France | 354/212 |
| 56/22185 | 5/1981 | Japan | 354/275 |

*Primary Examiner*—Donald A. Griffin
*Attorney, Agent, or Firm*—Ostrolenk, Faber, Gerb & Soffen

[57] ABSTRACT

An apparatus for mounting a film magazine into camera includes a magazine receiving casing which is adapted to receive a film magazine therein and which includes a drive shaft for driving a film winding shaft of the magazine for rotation. The casing is disposed in a tiltable manner with respect to a camera body to permit the insertion or removal of a film magazine into or from the casing.

27 Claims, 18 Drawing Figures

FIG. I(A) (PRIOR ART) 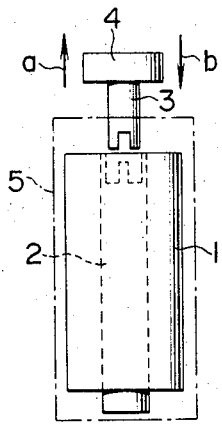
FIG. I(B) (PRIOR ART) 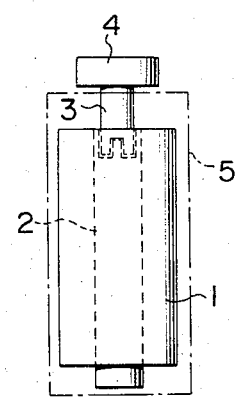

APPARATUS FOR MOUNTING A FILM MAGAZINE INTO CAMERA

BACKGROUND OF THE INVENTION

The invention relates to an apparatus for mounting a film magazine into a camera, and more particularly, to such apparatus in which a film magazine is detachably mounted in a given location within a camera.

A conventional arrangement for detachably mounting a film magazine into a film chamber of a camera is illustrated in FIG. 1A. As shown, a film magazine 1 includes a film winding shaft 2 which may be driven for rotation by a film rewind shaft 3, provided on the part of the camera, in order to rewind a film. The rewind shaft 3 is integrally formed with a rewind knob 4. When loading the magazine 1 into a film chamber 5, the knob 4 is pulled upwardly to cause the shaft 3 to slide axially as indicated by an arrow a. Subsequently, the magazine 1 is loaded into the chamber 5, whereupon the knob 4 is depressed to return the rewind shaft 3 as indicated by an arrow b (see FIG. 1B) so that a fork formed in the free end of the rewind shaft is fitted over a tab on the winding shaft 2. A removal of the film magazine 1 takes place by a similar procedure. With this arrangement, the loading or removal of the film magazine 1 is relatively cumbersome, and the arrangement is inadequate for use in a water-proof camera since the rewind shaft 3 is disposed to extend through the camera body for axial movement. If an O-ring or the like is provided on the rewind shaft 3 to assure the water tightness, an increased torque of the shaft 3 requires a greater force for film winding. Furthermore, the external exposure of the rewind knob 4 is not favorable in respect of appearance. In particular, the provision of such knob 4 is unnecessary and undesirable in an automatic film winding camera.

An arrangement is contemplated in a water-proof camera which allows an operating member located within tthe camera to pull up the rewind shaft 3 to be disengaged from the film winding shaft 2 in the magazine 1. However, this requires an increased space within the camera in order to allow the axial movement of the rewind shaft 3, resulting in an increased height of the camera.

As an alternative, a bottom plate which defines the film chamber of the camera may be formed integrally with a rear lid, so that the opening or closing of the rear lid permits the magazine 1 to be loaded or removed. However, this arrangement involves a complex arrangement to provide the water tightness, and still the reliability achieved is less than satisfactory. In addition, the required operation to load or remove the magazine is not a simple matter.

SUMMARY OF THE INVENTION

In view of the foregoing, it is an object of the invention to provide an apparatus for mounting a film magazine into a camera, including a magazine receiving casing which is tiltable relative to the camera body in a direction to facilitate the loading or removal of the film magazine.

In the arrangement of the invention, by merely tilting the magazine receiving casing, the top opening of the casing can be exposed for free insertion of a film magazine into it. Subsequently, the casing may be tilted in the reverse direction, whereupon the film magazine is reliably loaded in a proper position. As compared with the prior art, the loading or removal of a film magazine is greatly simplified and is reliably achieved while dispensing with any external operation of a drive shaft or the like. Consequently, the camera itself can be reduced in size while providing a better appearance. The invention can be extensively applied to a water-proof camera or other cameras having an automatic film winding or rewind mechanism.

BRIEF DESCRIPTION OF THE DRAWINGS

FIGS. 1A and B are schematic side elevations illustrating a prior art arrangement to load or remove a film magazine;

DESCRIPTION OF PREFERRED EMBODIMENTS

Figure 2A:
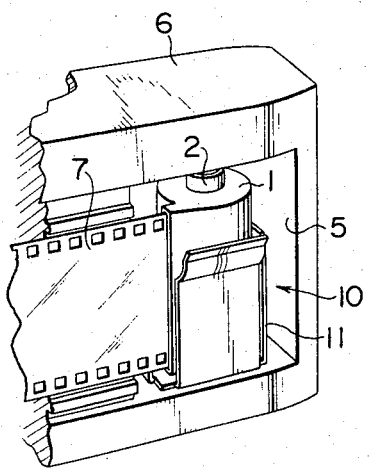
FIGS. 2A and B are perspective views of part of a camera which incorporates the apparatus for mounting a film magazine according to the invention.
Figure 2B:
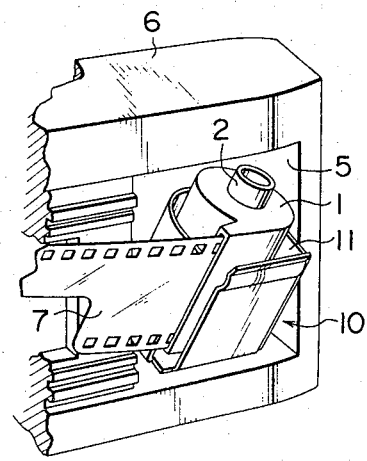

FIG. 2 shows a camera incorporating the apparatus for mounting a film magazine according to the invention, in perspective view, with a rear lid of the camera being removed. In FIG. 2A, the magazine is loaded in proper position while FIG. 2B illustrates the insertion or removal of the magazine. A film chamber 5 is defined within a camera body 6, and an apparatus 10 for mounting a film magazine includes a magazine receiving casing 11 which is disposed in the film chamber 5. In the loaded position of film 7 as shown in FIG. 2A, the casing 11 maintains the film magazine 1 in proper position therein. However, when the magazine 1 containing an exposed film is to be removed or when the magazine 1 containing an unexposed film is to be loaded, the casing 11 is tilted to project partly out of the camera body 6 in a direction to facilitate the removal of the film magazine 1 therefrom, as shown in FIG. 2B.

Figure 3:
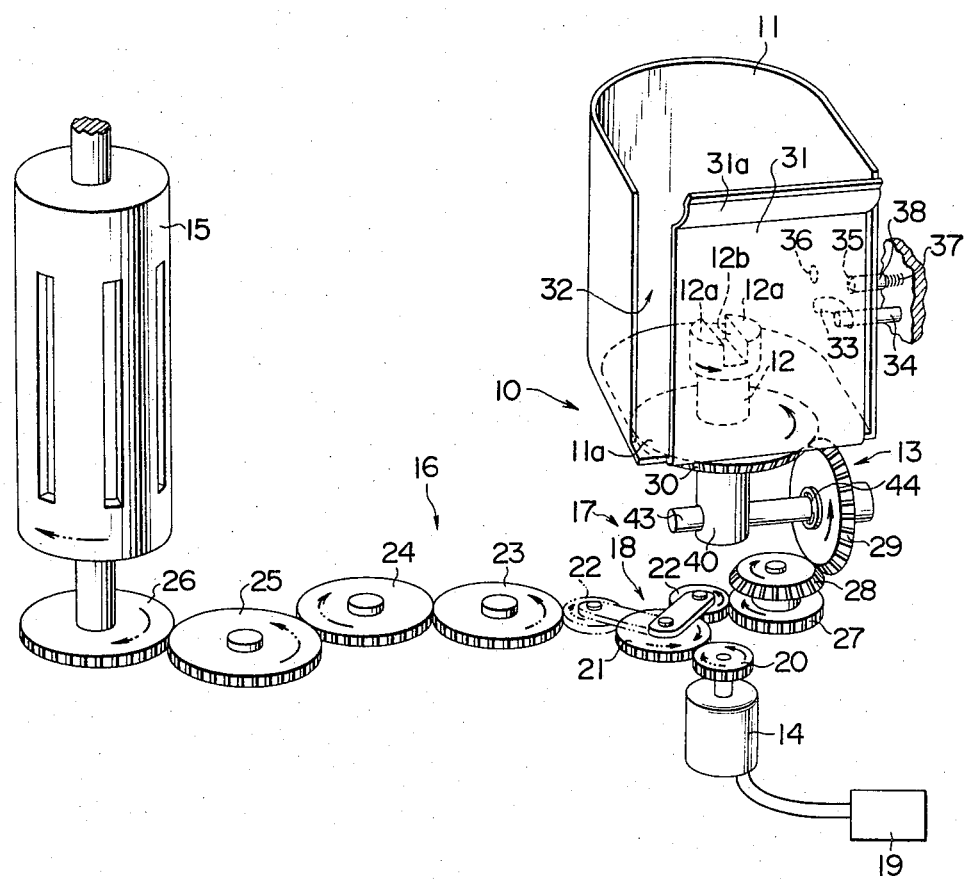
FIG. 3 is an enlarged perspective view of an apparatus for mounting a film magazine according to a first embodiment of the invention.

FIG. 3 is a perspective view of an apparatus for mounting a film magazine according to a first embodiment of the invention. The apparatus 10 includes a casing 11 which receives and maintains a film magazine therein, a drive shaft 12 disposed in the casing 11, and a bevel gearing 13 for transmitting a rotation to the drive shaft 12 during a film rewind operation and for allowing the casing 11 to be tilted to a position where the film magazine can be loaded or removed. It is to be understood that a camera incorporating the apparatus 10 has an automatic film winding mechanism 16 including a motor 14 to rotate a film winding spool 15, and also has an automatic rewind mechanism 17 which causes the drive shaft 12 to be driven for rotation by the motor 14 through the bevel gearing 13. The mechanisms 16, 17 are selectively operated. Specifically, the drive to the mechanisms 16, 17 is selectively supplied through a clutch 18. During a film winding operation, an electrical circuit 19 is activated to cause the motor 14 to rotate in a forward direction. A drive gear 20 is fixedly mounted on the output shaft of the motor 14, and is driven for rotation in a direction indicated by phantom line when the motor 14 is driven in the forward direction. The clutch 18 comprises a coupling gearing including a sun gear 21, to which the rotation of the drive gear 20 is transmitted. The clutch 18 also includes a planet gear 22, which is then driven to move around the sun gear 21 until it reaches a position indicated by phantom lines, whereupon its rotation is transmitted through a gear train 23, 24, 25 to a gear 26, which is integrally mounted on a support shaft of the spool 15, thus causing the spool 15 to rotate in a direction indicated by an arrow to provide a film winding operation. Conversely, during a film rewind operation, the electrical circuit 19 is activated to drive the motor 14 for rotation in the reverse direction, whereby the drive gear 20 rotates in a direction indicated by a solid line arrow. Such rotation of the gear 20 is transmitted to the sun gear 21, which then causes the planet gear 22 to return to the position shown in solid line where it meshes with a gear 27. A bevel gear 28 is integrally mounted on a common shaft with the gear 27, and meshes with another bevel gear 29 which is disposed in a plane perpendicular to that of the bevel gear 28. The bevel gear 29 is disposed for meshing engagement with a further bevel gear 30 which is disposed in a horizontal plane. In this manner, the drive from the motor 14 is transmitted to the bevel gear 30 and thence to the drive shaft 12 on which the bevel gear 30 is mounted, causing the drive shaft to rotate in a direction indicated by an arrow to provide a film rewind operation.

Figure 4:
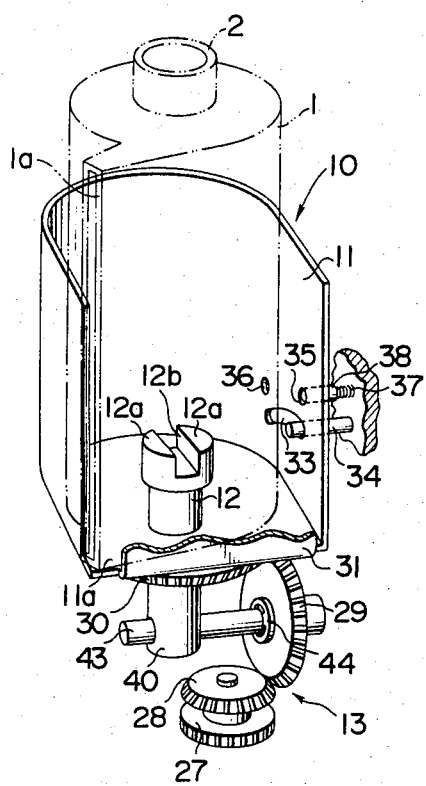
FIG. 4 is a perspective view of the apparatus shown in FIG. 3 when a magazine receiving casing has loaded a film magazine in proper position within a camera.
Figure 5:
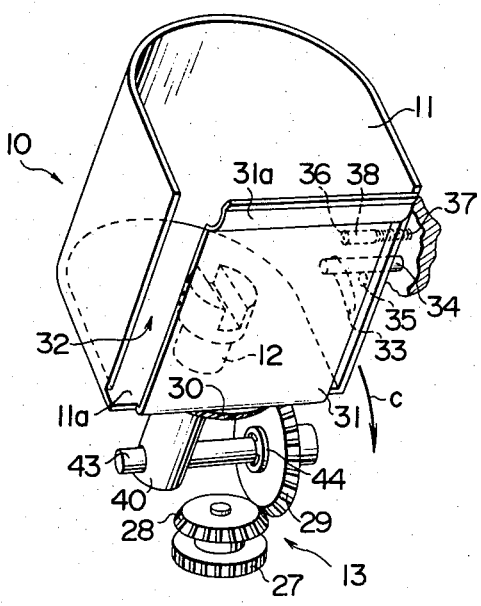
FIG. 5 is a perspective view of the apparatus shown in FIG. 3 when the casing assumes a tilted position.

Referring to FIG. 4, the casing 11 has an open top and has a vertical height which permits the top of the film magazine 1 to be externally exposed when the latter is disposed therein. As shown, the casing 11 is U-shaped in cross section, and its open side is partly covered by a stop sheet 31 integral with and vertically upstanding from a bottom plate 11a of the casing 11 in order to prevent the film magazine 1 from being thrown out of the casing when the latter assumes a tilted position, as indicated in FIG. 5. The casing 11 is formed of a relatively resilient sheet and hence the stop sheet 31 normally assumes a position in which it is at right angles to the bottom plate 11a. The stop sheet includes an upper edge 31a which is slightly curved to the exterior in order to prevent the magazine 1 from being damaged as it is inserted or removed and to provide a grip which permits the casing 11 to be manually operated. A gap 32 is formed between the left-hand edge of the stop sheet 31 and the adjacent end of the casing 11 to permit a film outlet 1a of the magazine 1 to extend therethrough and to be positioned therein. An arcuate guide slot 33 is formed in the right-hand limb of the casing 11, and is engaged by a stop pin 34 provided on the part of the camera in order to control the amount of angular movement of the casing 11. A pair of openings 35, 36 are formed in the limb above the slot 33 to be selectively engaged by a click member 38 which is normally urged against the casing 11 by a coiled spring 37 provided on the part of the camera, thus forming a click stop mechanism.

Figure 6:
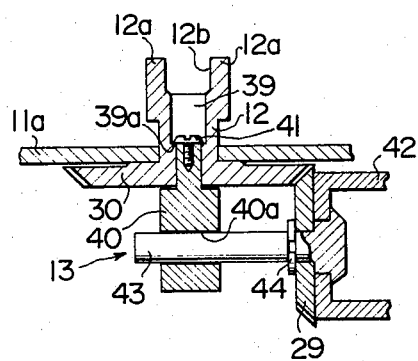
FIG. 6 is a cross section of a mechanism for rotating a drive shaft of the apparatus shown in FIG. 3.

The drive shaft 12 is rotatably disposed centrally in the bottom plate 11a of the casing 11, and has a pair of claws 12a separated by a central groove 12b formed in its upper end for engagement and connection with the film winding shaft 2 of the film magazine 1 (see FIGS. 1A and B), thereby presenting a forked configuration. As shown in FIG. 6, a through opening 39 is formed to extend through the drive shaft 12 and its integral bevel gear 30 which is located below the bottom plate 11a of the casing 11, in alignment with the axes of these elements, and has a reduced diameter in its lower portion into which a portion of a support shaft 40 having a reduced diameter is fitted. A screw 41 is threadably engaged into the end face of the upper end of such shaft portion and bears against a step 39a formed in the opening 39, whereby the drive shaft 12 is rotatably supported by the support shaft 40. An opening 40a extends through the lower portion of the support shaft 40 in a direction perpendicular to the axial direction thereof, and a stationary member 42 of the camera rotatably carries another support shaft 43 which extends through the opening 40a in a rotatable manner. The bevel gear 29 is mounted on the support shaft 43 in meshing engagement with the both bevel gears 28, 30, and is blocked against axial displacement by an E-ring 44.

By providing the bevel gearing 13 connected with the drive shaft 12 and disposed below the casing 11, the combination of the casing 11 and drive shaft 12 can be moved from the position shown in FIG. 4 to the tilted position shown in FIG. 5 without disengaging the meshing engagement between the gears of the automatic rewind mechanism 17. When the casing 11 is tilted from the position shown in FIG. 4 to the position shown in FIG. 5, the casing 11 angularly moves, in a direction indicated by an arrow c, about the support shaft 43 together with the drive shaft 12, the bevel gear 30 and the support shaft 40 while maintaining the meshing engagement between the bevel gears 30 and 29.

Figure 7A:
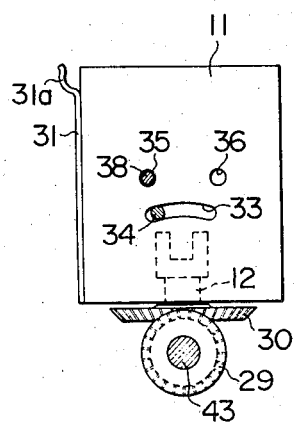
FIGS. 7A and B are side elevations of an apparatus shown in FIG. 3, as viewed from the right-hand side thereof.
Figure 7B:
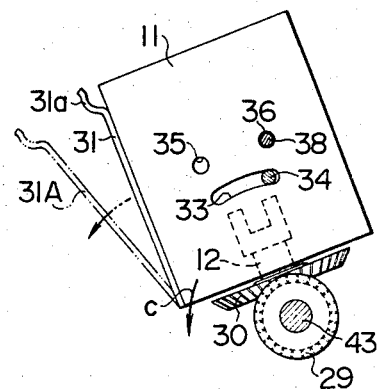

In use, when the rear lid of the camera is opened in order to load a film into the camera body 6, the casing 11 remains at rest with the drive shaft 12 in its upright position as indicated in FIGS. 4 and 7A. At this time, the stop pin 34 is located against the left-hand end, as viewed in FIG. 7A, of the guide slot 33 while the click member 38 is engaged with the left-hand opening 35, as viewed in FIG. 7, thus maintaining the casing in a stabilized position. Subsequently, when a finger engages the upper edge 31a of the stop sheet 31 integral with the casing 11 and draws it forward, both the casing 11 and the stop sheet 31 angularly move in the direction of the arrow c about the support shaft 43, thereby assuming a tilted position as shown in FIGS. 5 and 7B. The angle through which these members rotate is chosen to be sufficient to allow the top opening of the casing 11 to be completely oriented outside the camera body 6 to permit an easy access of the film magazine 1. When the casing 11 is angularly driven through its full extent, the stop pin 34 is located in abutment against the right-hand end, as viewed in FIG. 7B, of the guide slot 33 while the click member 38 is engaged with the right-hand opening 36, also as viewed in FIG. 7B, thus maintaining the casing in its filted position in a stabilized manner. The film magazine 1 is inserted into the casing 11 under this condition. As the film magazine 1 is inserted into the casing 11, the stop sheet 31 may be pulled further forwardly to a position shown at 31A shown in phantom line (FIG. 7B) where it is further removed from the body of the casing 11, thus providing an enlarged opening to facilitate the insertion of the film magazine. Since the drive shaft 12 moves integrally with the casing 11 as the latter is driven to its tilted position when the film magazine 1 is inserted into the casing 11, the film winding shaft 2 (see FIGS. 1A and B) of the magazine will be brought into alignment with the drive shaft 12. The film magazine 1 is inserted into the casing 11 so that the film outlet 1a thereof is positioned in the gap 32 defined between the stop sheet 31 and the casing 11. It is possible that during such insertion, the tab on the film winding shaft 2 of the magazine 1 may not be fitted into the fork on the upper end of the drive shaft 12 which comprises the claws 12a and groove 12b. In this instance, the film winding shaft 2 may be rotated by drawing a short length of the film 7 from the magazine 1 or manually rotating a portion of the film winding shaft 2 which extends above the upper end of the magazine 1, thus bringing the shaft 2 into engagement with the drive shaft 12 to locate the magazine 1 in proper position within the casing 11. After the film magazine 1 is disposed within the casing 11 as indicated in FIG. 2B, the stop sheet 31 may be pushed back, whereupon the casing 11 which has received the film magazine 1 therein is returned into the film chamber 5 formed in the camera body 6, completing a magazine mounting operation. As an alternative, it will be understood that the inner surface of the rear lid may be brought into abutment the upper edge 31a of the stop sheet 31, and the closure of the rear lid automatically locate the casing 11 properly within the film chamber 5 of the camera body 6, thus completing a magazine mounting operation. The film can be loaded properly into the camera by withdrawing a leader portion of the film 7 through the film outlet 1a which is disposed in the gap 32 and pulling it around the film winding spool 15 (see FIG. 3).

Figure 8A:
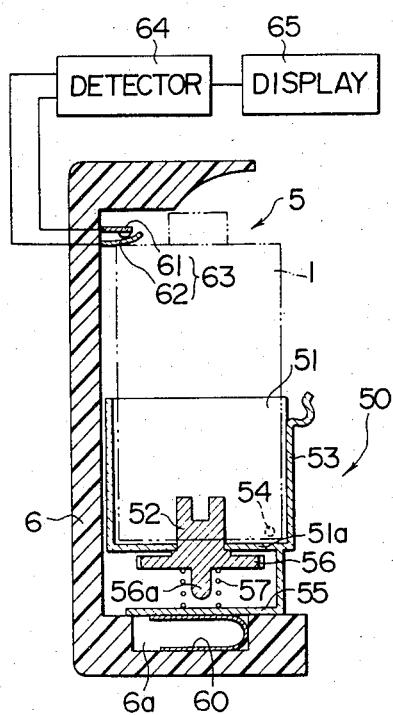
FIGS. 8A and B are cross sections of an apparatus for mounting a film magazine according to a second embodiment of the invention.
Figure 8B:
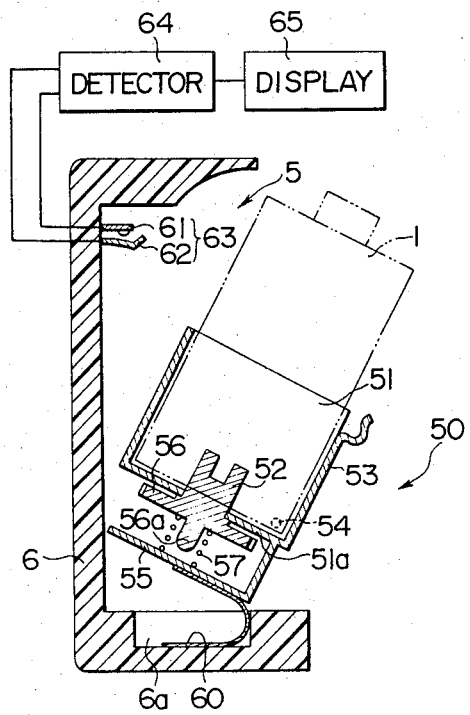
Figure 9:
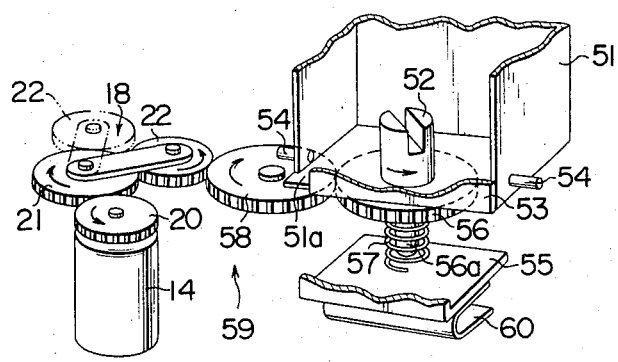
FIG. 9 is a perspective view of lower part of the apparatus shown in FIGS. 8A and B.

FIG. 8 is a cross section of an apparatus 50 for mounting a film magazine according to a second embodiment of the invention. FIG. 8A illustrates the film magazine 1 in its mounted position while FIG. 8B shows insertion or removal of the film magazine 1. The apparatus 50 includes a magazine receiving casing 51, having an open top and which is channel-shaped in cross section. As shown in FIG. 9, a pair of support pins 54 are fixedly mounted on the outside of both limbs of the casing 11 toward the open side and toward the bottom thereof for allowing the casing 51 to be pivotally mounted in the sidewalls which define the film chamber 5 formed in the camera body 6. As before, the casing 51 includes a stop sheet 53 which is constructed in the same manner as in the previous embodiment. The casing 51 includes a bottom plate 51a which is integrally provided with an L-shaped lower extension 55. A drive shaft 52 is rotatably disposed by extending through the bottom plate 51a, and has a lower end which projects below the bottom plate 51a on which a gear 56 is fixedly mounted. A shank 56a integrally depends downwardly from the lower surface of the gear 56, and a coiled compression spring 57 is disposed on the shank. In its unstressed condition, the length of the spring 57 is greater than the length of the shank 56a. The lower end of the coiled spring 57 is anchored to the horizontal limb of the lower extension 55. In this manner, by being disposed between the gear 56 and the lower extension 55, the spring 57 acts to maintain the gear 56 raised immediately below the bottom plate 51a. In the mounted condition shown in FIG. 8A, the gear 56 meshes with a gear 58, as shown in FIG. 9. Gear 58 is disposed for meshing engagement with a planet gear 22 of a clutch 18 which is utilized to change the direction of transmission of the drive from the drive gear 20 on the output shaft of the motor 14 between a film winding operation and a film rewind operation. Thus, the apparatus 50 includes an automatic rewind mechanism 59 which is simplified as compared with the bevel gearing described previously. In the region below the horizontal limb of the lower extension 55, the camera body 6 is formed with a notch 6a having a leaf spring 60 disposed therein which bears against the lower surface of the horizontal limb of the extension 55, thus urging, through the extension 55, the casing 51 to move angularly about the support pins 54 to its tilted position shown in FIG. 8B.

It will be noted that a magazine detecting switch 63 comprising a fixed contact 61 and movable contact 62 is disposed in the upper portion of the film chamber 5 as shown in FIGS. 8A and B. These contacts are connected to a detection circuit 64 which is in turn connected to a display 65 which is disposed on the external surface of the camera body 6. The movable contact 62 comprises an electrically conductive leaf spring or like member, and may be moved toward or away from the fixed contact 61 to turn the switch 63 on and off. In the magazine mounted condition shown in FIG. 8A, the upper end of the magazine 1 pushes up the movable contact into engagement with the fixed contact 61 to turn switch 63 on, thus activating the detection circuit 64 to provide an indication by the display 65 that the film magazine 1 is mounted. Under this condition, the movable contact 62 constrains the casing 51 from angularly moving about the support pins 54 under the resilience of the leaf spring 60, by bearing against the upper left-hand end of the magazine 1. When it is desired to remove the film magazine 1, it may be slightly pulled out until it is disengaged from the movable contact 62, whereupon the resilience of the leaf spring 60 brings the casing 51 to its tilted position shown in FIG. 8B. In the tilted position of the casing 51, the movable contact 62 is removed from the fixed contact 61 to turn the switch 63 off, whereby the display 65 ceases its indication that the magazine is mounted. At this time, the gear 56 is driven upward to be disengaged from the gear 58.

Figure 10:
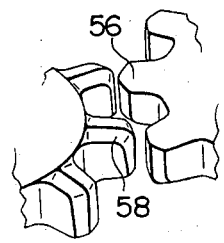
FIG. 10 is an enlarged perspective view of part of gears used in the apparatus of FIG. 8, illustrating the configuration of the tooth tip.

To return the casing 51 from its tilted position to its mounted position, it is only necessary that utilizing the rear lid of the camera or the like, the casing 51 be pushed into the camera against the resilience of the leaf spring 60 while containing the film magazine 1 therein. The gear 56 then returns into meshing engagement with the gear 58, and movable contact 62 bears against the magazine 1 to maintain it in its mounted position. To assure a smooth engagement and disengagement between the gears 56, 58, their teeth are chamfered as indicated in FIG. 10. When no film magazine is disposed in the casing 51, the movable contact 62 is ineffective to constrain the casing 51 from angularly moving about the support pins, but as the rear lid of the camera is closed, it assumes a normal position as indicated in FIG. 8A. Of course, the movable contact 62 remains removed from the fixed contact 61 to turn the switch 63 off, and hence the display 65 is disabled, indicating the absence of the film magazine 1 in the casing 51.

Figure 11:
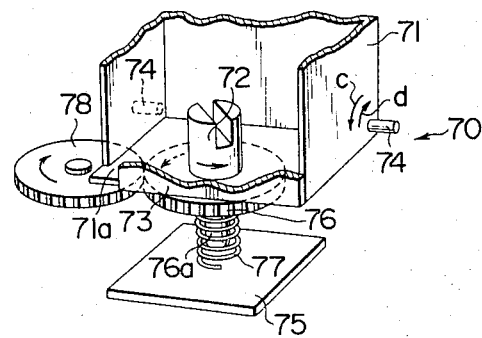
FIG. 11 is a perspective view of part of an apparatus for mounting a film magazine according to a third embodiment of the invention.

FIG. 11 is a perspective view of part of an apparatus 70 for mounting a film magazine according to a third embodiment of the invention. The apparatus 70 includes a magazine receiving casing 71 which is generally similarly constructed as the casing 51 of the previous embodiment, including the provision of a stop sheet 73, except that a pair of support pins 74 are fixedly mounted on the outside of the both limbs thereof toward the bottom thereof and toward the base which interconnects the both limbs. In this manner, it is rotatably mounted in the sidewalls which defines the film chamber 5 (see FIG. 2) of the camera body 6 as before. The casing 71 includes a bottom plate 71a in which a drive shaft 72 integral with a gear 76 is rotatably mounted in a manner to permit its vertical movement. A shank 76a depends downwardly from the gear 76, and a coiled compression spring 77 is disposed thereon and acts between the gear 76 and a stationary plate 75 which defines the bottom of the film chamber to be normally compressed. Consequently, the gear 76 is urged upward by the spring 77 to cause the casing 71 to move angularly about the support pins 74 in a direction indicated by an arrow d, thus maintaining the film magazine 1 mounted in the film chamber. Under this condition, the gear 76 meshes with a gear 78 which in turn meshes with the planet gear 22 of the clutch 18. When the planet gear 22 (see FIGS. 3 and 9) causes the gear 78 to rotate clockwise during a film rewind operation, the gear 76 rotates counter-clockwise about the axis of the shank 76a on which the coiled spring 77 is disposed, thus rotating the drive shaft 72 in the same direction.

Figure 12:
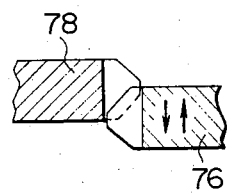
FIG. 12 is a cross section of part of gears used in the apparatus of FIG. 11, illustrating a meshing engagement therebetween.

When the film magazine 1 is to be mounted or to be removed, the casing 71 may be angularly moved about the support pins 74 in a direction indicated by an arrow c. At this time, the gear 76 is moved down against the resilience of the spring 77, together with the bottom plate 71a of the casing 71, whereby it is disengaged from the gear 78. By chamfering the tooth edge of the gears 76, 78 as shown in FIG. 12 and providing a reduced depth of engagement therebetween, the gear 76 can be easily disengaged from the gear 78 when the casing 71 is tilted, thus assuring a smooth movement of the casing 71 to its tilted position where the film magazine 1 can be easily inserted or removed. After the insertion or removal of the film magazine 1, the casing 71 may be released, whereupon the resilience of the spring 77 returns the casing 71 from its tilted position to its upright position. At this time, the gear 76 moves upward into meshing engagement with the gear 78.

Figure 13:
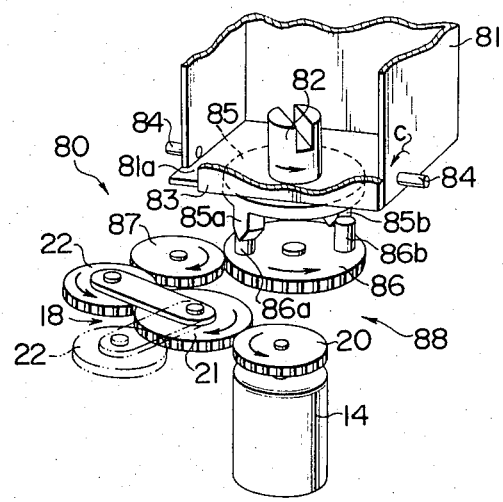
FIG. 13 is a perspective view of part of an apparatus for mounting a film magazine according to a fourth embodiment of the invention.

FIG. 13 is a perspective view of part of an apparatus 80 for mounting a film magazine according to a fourth embodiment of the invention. The apparatus 80 includes a magazine receiving casing 81 which is constructed generally in the same manner as in the second embodiment, inclusive of the provision of a stop sheet 83 and a pair of support pins 84 which are located in the same manner as shown in FIG. 8. The casing 81 includes a bottom plate 81a, and a drive shaft 82 extends therethrough and is rotatably disposed therein. A connector disc 85 is fixedly mounted on the lower end of the drive shaft 82 which extends below the bottom plate 81a, and is integrally formed with a pair of diametrically opposite projections 85a, 85b which depend downwardly from the lower surface thereof adjacent to the peripheral edge and which have a tapered sharp edge. A gear 86 is located directly below the connector disc 85 and has a pair of diametrically opposite connector pins 86a, 86b formed on the upper surface thereof. The arrangement is such that during the rotation of the gear 86, the connector pins 86a, 86b thereon are engageable with the projections 85a, 85b on the connector disc 85. During a film rewind operation, the drive from the drive gear 20 mounted on the output shaft of the motor 14 is transmitted to the gear 86 through the clutch 18 comprising a coupling gearing including the sun gear 21, planet gear 22 and transmission gear 87, thus forming an automatic rewind mechanism 88. It will be noted that the automatic rewind mechanism 88 of the apparatus 80 is also simplified in arrangement as compared with the bevel gearing mentioned previously. As shown, the gear 86 rotates counterclockwise during a film rewind operation, so that the connector pins 86a, 86b thereon engage the projections 85a, 85b on the connector disc 85 to transmit the rotation of the gear 86 to the drive shaft 82.

Figure 14:
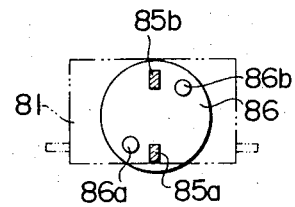
FIG. 14 is a plan view illustrating the relationship between a drive shaft and a gear used in the arrangement of FIG. 13.

When the film magazine 1 is to be mounted or removed, the casing 81 may be tilted to cause its angular movement about the support pins 84 in a direction indicated by an arrow c, thus disengaging the projections 85a, 85b from the connector pins 86a, 86b. It is to be noted that when the projections and connector pins are engaged with each other as shown, the film winding shaft 2 of the magazine 1 may be slightly turned until the projections 85a, 85b assume positions shown in FIG. 14. When the projections assume such positions, the coupling between the connector disc 85 and gear 86 is released to facilitate a tilting of the casing 81 to a position where the film magazine 1 can be easily inserted or removed. When the casing 81 is returned to its original position after the insertion or removal of the film magazine 1, the connector disc 85 is turned to a position where the projections 85a, 85b thereon are engageable with the connector pins 86a, 86b on the gear 86. If the connector pins 86a, 86b are located in alignment with the projections 85a, 85b during such process, the sharp edge of the projections 85a, 85b avoids an abutment of the projections against the connector pins.

What is claimed is:

1. Apparatus, comprising:
   a camera body having a film chamber formed therein;
   a magazine receiving casing for receiving a film magazine therein;
   mounting means for tiltably mounting said casing in said film chamber so that it is movable between a first position wherein said casing is wholly located in said chamber and a second position wherein said casing extends at least partially outside of said camera body to permit insertion or removal of a film magazine; and
   a drive shaft extending into said casing and adapted to engage a film shaft of a film magazine when a film magazine is located in said casing, said drive winding shaft tilting with said casing.

2. An apparatus according to claim 1 in which said magazine receiving casing has an open top and is channel-shaped in cross section including an open side which is covered by a stop sheet, the stop sheet providing a grip to enable a user to tilt said casing, said stop sheet being resilient such that it can be pulled away from said casing so as to increase the effective size of said top opening.

3. An apparatus according to claim 2, wherein said camera body has a rear lid, and wherein said casing is located in such a position that said stop sheet abuts the inner surface of said rear lid of said camera body when said rear lid is closed so that said casing may be returned into said first position within said camera body as said lid is closed.

4. An apparatus according to claim 2 in which said magazine receiving casing is angularly movable about a pair of suport pins fixedly mounted on opposite sides thereof toward the bottom thereof at a location remote from the open side and which are pivotally mounted in said camera body, said casing being normally urged to said first position by a coiled spring disposed below said casing.

5. An apparatus according to claim 1 in which said casing has a notch formed therein which is utilized to locate a film outlet of the film magazine therein.

6. An apparatus according to claim 1 further including a click stop mechanism for allowing said magazine receiving casing to be maintained in said first and second positions.

7. An apparatus according to claim 1 further including a bevel gearing disposed below said magazine receiving casing and coupled to said drive shaft for rotation therewith, said mounting means mounting both said casing and said bevel gearing to said camera body for rotation about an axis which is perpendicular to an axis of rotation of said drive shaft.

8. An apparatus according to claim 7 in which an angular movement of the casing is guided by a guide slot and stop pin arrangement formed in said casing and on said camera body, respectively.

9. An apparatus according to claim 1 in which the casing is angularly movable about a pair of support pins fixedly mounted on opposite sides thereof toward the bottom thereof and which are pivotally mounted in the camera body.

10. An apparatus according to claim 1 in which the casing is normally urged toward said second position by the resilience of a leaf spring disposed below said casing.

11. An apparatus according to claim 10 further including a spring member mounted at a given position on said camera body adapted to engage an upper end of a film magazine which is received in said casing for constraining said casing from angular movement under resilience of the leaf spring.

12. An apparatus according to claim 11 in which the spring member comprises a second leaf spring which forms a movable electric contact disposed adjacent to a fixed electric contact, said movable contact being urged into contact with said fixed contact when a film magazine is received in said casing to provide a switching action for a detection circuit which indicates the presence of a film magazine in said casing.

13. An apparatus according to claim 1 in which the drive shaft is disposed in said bottom of said casing and is integral with a spur gear which it utilized for drive transmission, and further including a coiled spring which normally urges said drive shaft into said casing.

14. An apparatus according to claim 13 in which said coiled spring also serves as a resilient member which returns said magazine receiving casing into said first position within said camera body.

15. An apparatus according to claim 13 in which said spur gear integral with said drive shaft is disposed for meshing engagement with another gear, but is disengaged from said another gear when said casing is moved to said second position, both said gears having their teeth edge chamfered to facilitate an engagement and disengagement therebetween.

16. An apparatus according to claim 1 in which said drive shaft is disposed in the bottom of said magazine receiving casing and is integrally formed with a connection member carrying drive transmitting projections on the lower surface thereof, and said apparatus further including a drive transmitting gear carrying projections which are engageable with the projections of said connection member and disposed in opposing relationship with said connection member, said projections on said connection member being disengaged from said projections on said transmitting gear when said casing is angularly moved to said second position.

17. An apparatus according to claim 1 wherein said drive shaft maintains a predetermined orientation with respect to said casing as said casing is moved between said first and second positions.

18. Apparatus comprising:
a camera body having a film chamber formed therein;
a magazine receiving casing for receiving a film magazine therein, said magazine receiving casing having an open top which is channel-shaped in cross-section including an open side which is covered by a stop sheet, said stop sheet providing a grip to enable a user to tilt said casing, said stop sheet being resilient such that it can be pulled away from said casing so as to increase the effective size of said top opening;
mounting means for tiltably mounting said casing in said film chamber so that is is movable between a first position wherein said casing is wholly located in said chamber and a second position wherein said casing extends at least partially outside of said camera body to permit insertion or removal of a film magazine; and
a drive shaft extending into said casing and adapted to engage a film winding shaft of a film magazine when a film magazine is located in said casing.

19. An apparatus according to claim 18, wherein said camera body has a rear lid and wherein said casing is located in such a position that said stop sheet abuts the inner surface of said rear lid of said camera body when said rear lid is closed so that said casing may be returned into said first position within said camera body as said lid is closed.

20. An apparatus according to claim 18 wherein said magazine receiving casing is angularly movable about a pair of support pins fixedly mounted on opposite sides thereof towards the bottom thereof at a location remote from said open side and which are pivotally mounted in said camera body, said casing being normally urged to said first position by a coiled spring disposed below said casing.

21. Apparatus, comprising:
a camera body having a film chamber formed therein;
a magazine receiving casing for receiving a film magazine therein;
mounting means for tiltably mounting said casing in said film chamber so that it is movable between a first position wherein said casing is wholly located in said chamber and a second position wherein said casing extends at least partially outside of said camera body to permit insertion or removal of a film magazine;

a drive shaft extending into said casing and adapted to engage a film winding shaft of a film magazine when a film magazine is located in said casing; and a bevel gear disposed below said magazine receiving casing and coupled to said drive shaft for rotation therewith, said mounting means mounting both said casing and said bevel gear into said camera body for rotation about an axis which is perpendicular to an axis of rotation of said drive shaft.

22. An apparatus according to claim 21, wherein angular movement of said casing is guided by a guide slot and a stop pin arrangement formed in said casing and on said camera body, respectively.

23. Apparatus comprising:

a camera body having a film chamber formed therein;

a magazine receiving casing for receiving a film magazine therein;

mounting means for tiltably mounting said casing in said film chamber so that it is movable between a first position wherein said casing is wholly located in said chamber and a second position wherein said casing extends at least partially outside of said camera body to permit insertion or removal of a film magazine;

a drive shaft extending into said casing and adapted to engage a film winding shaft of a film magazine when a film magazine is located in said casing; and said casing being urged towards said second position by the resilience of a leaf spring disposed below said casing; and a spring member mounted at a position on said camera body which will cause said spring member to engage an upper end of a film magazine which is received in said casing for constraining said casing from angular movement under the resilience of said leaf spring, said spring member comprising a second leaf spring which forms a movable electric contact disposed adjacent to a fixed contact, said movable connact being urged into contact with said fixed contact when a film magazine is received in said casing to provide a switching action for a detection circuit which indicates the presence of a film magazine in said casing.

24. Apparatus, comprising:

a camera body having a film chamber formed therein;

a magazine receiving casing for receiving a film magazine therein;

mounting means for tiltably mounting said casing in said film chamber so that it is movable between a first position wherein said casing is wholly located in said chamber and a second position wherein said casing extends at least partially outside of said camera body to permit insertion or removal of a film magazine;

a drive shaft extending into said casing and adapted to engage a film winding shaft of a film magazine when a film magazine is located in said casing;

said drive shaft being disposed in the bottom of said casing and being integral with a spur gear which is utilized for drive transmission; and a coiled spring which normally urges said drive shaft into said casing.

25. An apparatus according to claim 24, in which said coiled spring also serves as a resilient member which returns said magazine receiving into said first position within said camera body.

26. An apparatus according to claim 24, in which said spur gear is disposed for meshing engagement with another gear, but is disengaged from said another gear when said casing is moved to said second position, both said gears having their teeth chamfered to facilitate an engagement and disengagement therebetween.

27. Apparatus comprising:

a camera body having a film chamber formed therein;

a magazine receiving casing for receiving a film magazine therein;

mounting means for tiltably mounting said casing in said film chamber so that it is movable between a first position wherein said casing is wholly located in said chamber and a second position wherein said casing extends at least partially outside of said camera body to permit insertion or removal of a film magazine;

a drive shaft extending into said casing and adapted to engage a film winding shaft of a film magazine when a film magazine is located in said casing;

said drive shaft being disposed in the bottom of said magazine receiving casing and being integrally formed with a connection member carrying drive transmitting projections on the lower surface thereof; and a drive transmitting gear carrying projections which are engageable with the projections of said connection member and disposed in opposing relationship with said connection member, said projections on said connection member being disengaged from said projections on said transmitting gear when said casing is angularly moved to its said second position.

* * * * *